(12) United States Patent
Bellessa et al.

(10) Patent No.: US 10,178,033 B2
(45) Date of Patent: Jan. 8, 2019

(54) SYSTEM AND METHOD FOR EFFICIENT TRAFFIC SHAPING AND QUOTA ENFORCEMENT IN A CLUSTER ENVIRONMENT

(71) Applicant: International Business Machines Corporation, Armonk, NY (US)

(72) Inventors: John C. Bellessa, Somerville, MA (US); Cheng-Ta Lee, Taipei (TW); Chih-Hsiung Liu, Taipei (TW); Joey H. Y. Tseng, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 15/484,487

(22) Filed: Apr. 11, 2017

(65) Prior Publication Data

US 2018/0295062 A1   Oct. 11, 2018

(51) Int. Cl.
*H04L 12/803* (2013.01)
*H04L 12/801* (2013.01)
*H04L 29/06* (2006.01)
*H04L 29/08* (2006.01)

(52) U.S. Cl.
CPC ............ *H04L 47/125* (2013.01); *H04L 47/34* (2013.01); *H04L 67/02* (2013.01); *H04L 67/42* (2013.01)

(58) Field of Classification Search
CPC ..... H04L 47/125; H04L 47/34; H04L 47/525; H04L 47/261; H04L 47/629–47/6295; H04L 67/02; H04L 2012/568–2012/5682; H04L 67/42
See application file for complete search history.

(56) References Cited

U.S. PATENT DOCUMENTS

| 6,246,684 | B1 | 6/2001 | Chapman et al. |
| 7,392,279 | B1 | 6/2008 | Chandran et al. |
| 2002/0138643 | A1 | 9/2002 | Shin et al. |
| 2003/0081623 | A1 | 5/2003 | Kiremidjian et al. |

(Continued)

FOREIGN PATENT DOCUMENTS

EP   1232610 B1   7/2009

OTHER PUBLICATIONS

Piana et al., Queuing, Scheduling and Traffic Shaping over IP Networks, IEEE 2004, 5 pgs.

*Primary Examiner* — Eric Myers
(74) *Attorney, Agent, or Firm* — William H. Hartwell; Maxine L. Barasch; Keohane & D'Alessandro PLLC

(57) ABSTRACT

Embodiments provide a virtual queue management system within the cluster of gateways. When a network message arrives at the gateway cluster, it is processed by one of the gateways within the cluster. The gateway that is processing the network message obtains identifying parameters. The identifying parameters can include, but are not limited to, an Internet Protocol (IP) address, a port number, and/or an HTTP command. The gateway creates a virtual queue identifier based on the obtained identifying parameters. The first gateway to receive a network message with a given virtual queue identifier assumes the role of virtual queue manager for that virtual queue. The virtual queue manager gateway informs other gateways within the cluster of the proper sequence for sending network messages to the server such that messages are transmitted to the server in the proper temporal order.

20 Claims, 10 Drawing Sheets

(56) References Cited

U.S. PATENT DOCUMENTS

| | | | |
|---|---|---|---|
| 2008/0025289 A1 | 1/2008 | Kapur et al. | |
| 2013/0128896 A1* | 5/2013 | Munoz | H04L 49/9078 370/412 |
| 2015/0222561 A1* | 8/2015 | Okuno | H04L 47/522 370/235 |
| 2017/0295099 A1* | 10/2017 | Murphy | H04L 47/125 |

* cited by examiner

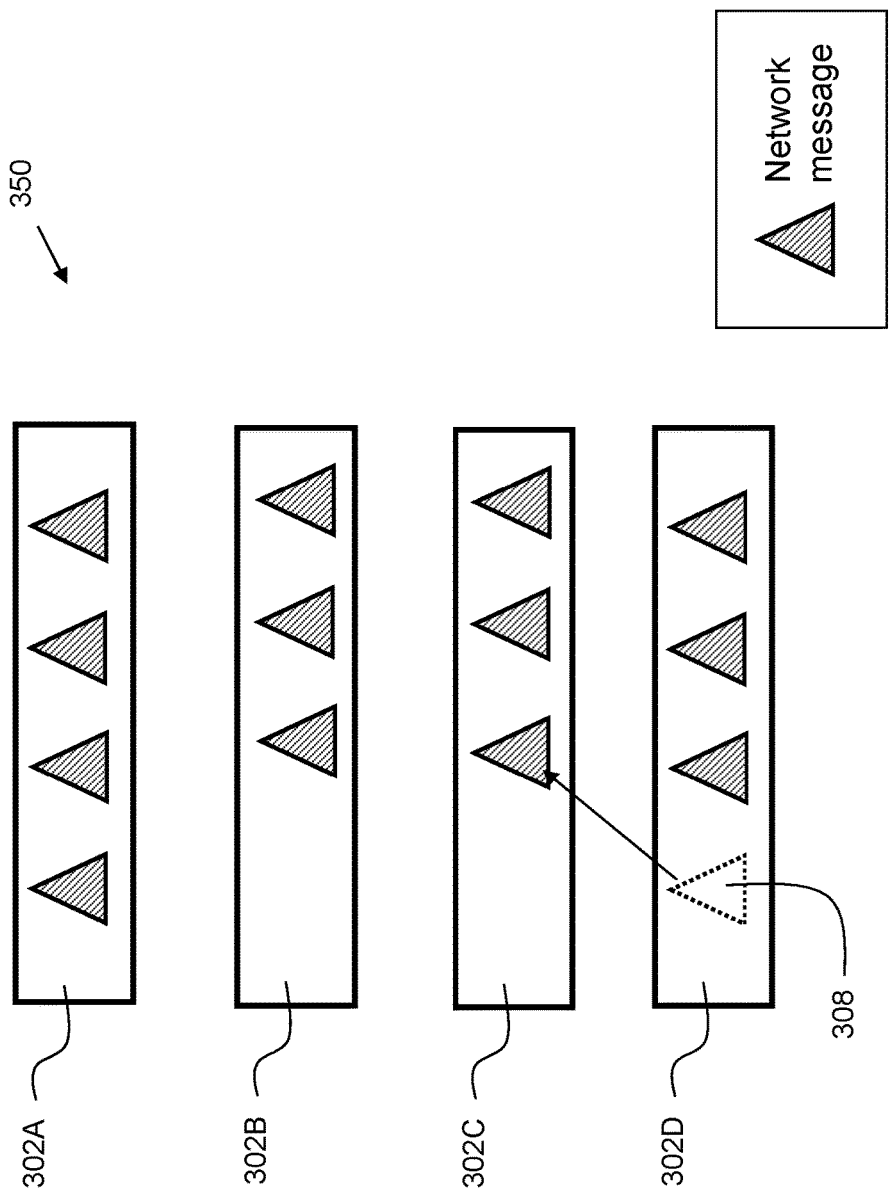

SYSTEM AND METHOD FOR EFFICIENT TRAFFIC SHAPING AND QUOTA ENFORCEMENT IN A CLUSTER ENVIRONMENT

FIELD OF THE INVENTION

The present invention relates generally to computer networking, and more particularly, systems and methods for efficient traffic shaping and quota enforcement in a cluster environment.

BACKGROUND

Web application traffic management is a critical feature for enterprise application gateways. A gateway cluster can be employed to protect the backend infrastructure from being overwhelmed by an unexpected traffic burst, or by a malicious denial of service (DOS) attack. These days, the new API-based programming paradigm highlights the importance of being able to restrict HTTP-based traffic in a cluster of gateways based on a specific policy. A typical policy could include limits on the number of requests per month and/or per second for a given client to access a backend server. Client requests that violate the policy are buffered (e.g., stored in memory) or rejected. While this technique serves to protect the backend server from being overwhelmed by excess traffic, it can also cause some suboptimal performance in various situations. It is therefore desirable to have improvements in network traffic management in a cluster environment.

SUMMARY

Embodiments provide a virtual queue management system within the cluster of gateways. When a network message arrives at the gateway cluster, it is processed by one of the gateways within the cluster. The gateway that is processing the network message obtains identifying parameters. The identifying parameters can include, but are not limited to, an Internet Protocol (IP) address, a port number, and/or an HTTP command. The gateway creates a virtual queue identifier based on the obtained identifying parameters. The first gateway to receive a network message with a given virtual queue identifier assumes the role of virtual queue manager for that virtual queue. The virtual queue manager gateway informs other gateways within the cluster of the proper sequence for sending network messages to the server such that messages are transmitted to the server in the proper temporal order.

In one aspect, there is provided a computer-implemented method for processing network traffic in a gateway cluster comprising a plurality of gateways, the method comprising: obtaining one or more identifying parameters for a network traffic flow comprising a plurality of network messages; creating a virtual queue identifier based on the one or more identifying parameters upon detecting a first instance of the one or more identifying parameters; establishing a virtual queue manager for a virtual queue associated with the virtual queue identifier on one gateway from the plurality of gateways; assigning a sequence number for each of the plurality of network messages; and transmitting the plurality of network messages in a temporal order based on the assigned sequence number.

In another aspect, there is provided an electronic computing device for processing network traffic, comprising: a processor; a memory coupled to the processor, the memory containing instructions, that when executed by the processor, perform the steps of: obtaining one or more identifying parameters for a network traffic flow comprising a plurality of network messages; creating a virtual queue identifier based on the one or more identifying parameters upon detecting a first instance of the one or more identifying parameters; establishing a virtual queue manager for a virtual queue associated with the virtual queue identifier on one gateway from the plurality of gateways; assigning a sequence number for each of the plurality of network messages; and transmitting the plurality of network messages in a temporal order based on the assigned sequence number.

In yet another aspect, there is provided a computer program product for processing network traffic in a gateway cluster on an electronic computing device, the electronic computing device comprising a computer readable storage medium having program instructions embodied therewith, the program instructions executable by a processor to cause the electronic computing device to: obtain one or more identifying parameters for a network traffic flow comprising a plurality of network messages; create a virtual queue identifier based on the one or more identifying parameters upon detecting a first instance of the one or more identifying parameters; establish a virtual queue manager for a virtual queue associated with the virtual queue identifier on one gateway from the plurality of gateways; assign a sequence number for each of the plurality of network messages; and transmit the plurality of network messages in a temporal order based on the assigned sequence number.

BRIEF DESCRIPTION OF THE DRAWINGS

Features of the disclosed embodiments will be more readily understood from the following detailed description of the various aspects of the invention taken in conjunction with the accompanying drawings.

FIG.3A and FIG. 3B illustrate an example of resource balancing in accordance with embodiments of the present invention.

FIG. 4A and FIG. 4B illustrate an example of defragmentation in accordance with embodiments of the present invention.

Figure 1:
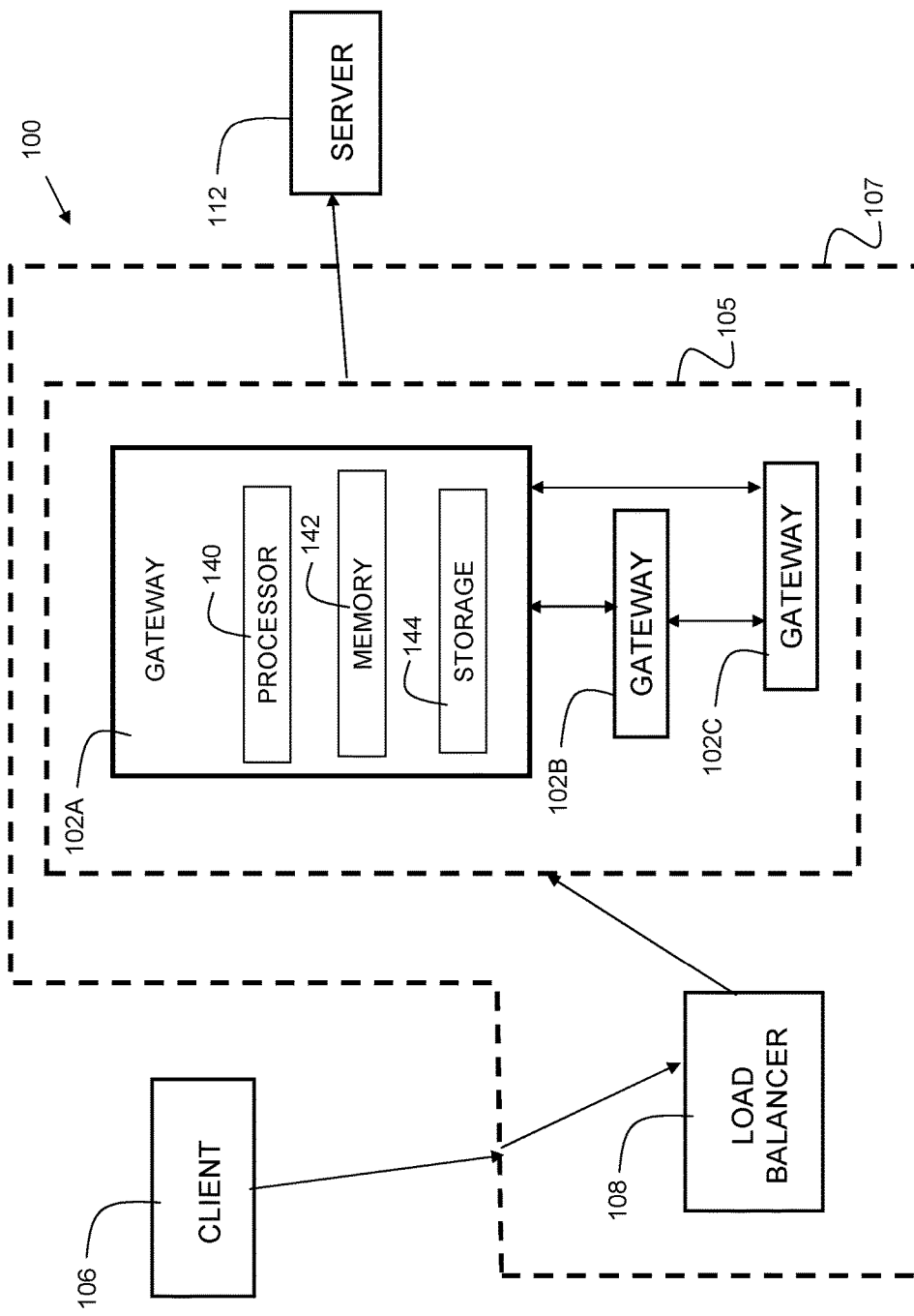
FIG. 1 is a block diagram showing a gateway cluster in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for efficient traffic shaping and quota enforcement in a cluster environment. Enterprise application API management relies on an accurate quota enforcement function provided by the application gateway. This can serve to prevent abuse of resources and/or denial of service attacks. The gateway monitors traffic from each incoming address, and throttles traffic if the quota is exceeded. For example, a web service may be set up for occasional use by individual users. If someone writes a script to repeatedly access the web service, it could potentially bring down the web service. The quota enforcement buffers network messages when the quota is exceeded. The buffered network messages are sent at a later time. This has the effect of smoothing out bursts of data. In this way, if there is a burst of data from a particular source address, the data is sent out by the gateway in a delayed manner to avoid overwhelming the server that is hosting the web service.

To support high volumes of concurrent traffic, multiple gateways are grouped into a cluster that shares the loading while enforcing the quota enforcement policy. With such a cluster, in prior art systems, there is no guarantee that the transaction (sequence of network messages) will arrive at the server in order when the messages are sent under the conditions of when the quota enforcement policy is in effect.

Disclosed embodiments address the aforementioned problem, among others, by implementing a virtual queue management system within the cluster of gateways. When a network message arrives at the gateway cluster, it is processed by one of the gateways within the cluster. The gateway that is processing the network message obtains identifying parameters. The identifying parameters can include, but are not limited to, an Internet Protocol (IP) address, a port number, and/or an HTTP command. The gateway creates a virtual queue identifier based on the obtained identifying parameters. The first gateway to receive a network message corresponding to a given virtual queue identifier assumes the role of virtual queue manager for that virtual queue. The virtual queue manager gateway informs other gateways within the cluster of the proper sequence for sending network messages to the server such that messages are transmitted to the server in the proper temporal order. In this way, the proper and/or expected behavior of applications that rely on the preservation of the temporal order is maintained.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a block diagram 100 showing a gateway cluster 105 in accordance with embodiments of the present invention. Cluster 105 is shown as comprised of three gateways indicated as 102A, 102B, 102B. While three gateways are shown in diagram 100, in practice, a cluster may have more or fewer gateways. Although only shown with respect to gateway 102A, each gateway includes a processor 140, memory 142, and storage 144. Each gateway includes instructions stored in memory 142 for processor 140 to execute elements of embodiments of the present invention. Memory 142 may include dynamic random access memory (DRAM), static random access memory (SRAM), flash, EEPROM, or other suitable memory. In some embodiments, the memory 142 may not be a transitory signal per se. The storage 144 may include non-volatile memory, magnetic storage, solid state storage, flash, or other suitable technology.

Each gateway (102A, 102B, 102C) within cluster 105 can communicate with each other via a data communication network. In embodiments, the data communication network may include, but is not limited to, an Ethernet network, a wireless network, or a backplane system. This enables the gateways to determine which gateway within the cluster is acting as the virtual queue manager for a given virtual queue. If no gateway is currently acting as the virtual queue manager, then the gateway that receives the first network message that hashes to that virtual queue identifier becomes the virtual queue manager for that traffic.

Block diagram 100 includes a client 106. In embodiments, the client 106 may be a desktop computer, laptop computer, tablet computer, mobile phone, or other computing device. The client sends requests to server 112 via network 107. Network 107 may include a load balancer 108 which routes traffic to a gateway within the gateway cluster 105. Additionally, network 107 may include other elements not shown, such as firewalls, routers, switches, hubs, repeaters, bridges, and the like.

When client 106 exceeds its quota of traffic, a quota enforcement policy is invoked to buffer requests within a gateway. As an example, client 106 may have a quota of 10 network messages per second. If, within a particular one second time interval, the client 106 attempts to send 13 network messages to server 112, then the $11^{th}$, $12^{th}$, and $13^{th}$ messages will be buffered and not immediately sent to the server 112. Over the next few seconds, those messages will be sent out to the server.

Since there are multiple gateways within the cluster, it is possible that different gateways can buffer different network messages that are part of the same network transaction/flow. Thus, the virtual queue manager provides a way to coordinate output of all the gateways within the server to ensure that the temporal sequence of network messages from the client 106 to the server 112 is preserved.

Figure 2A:
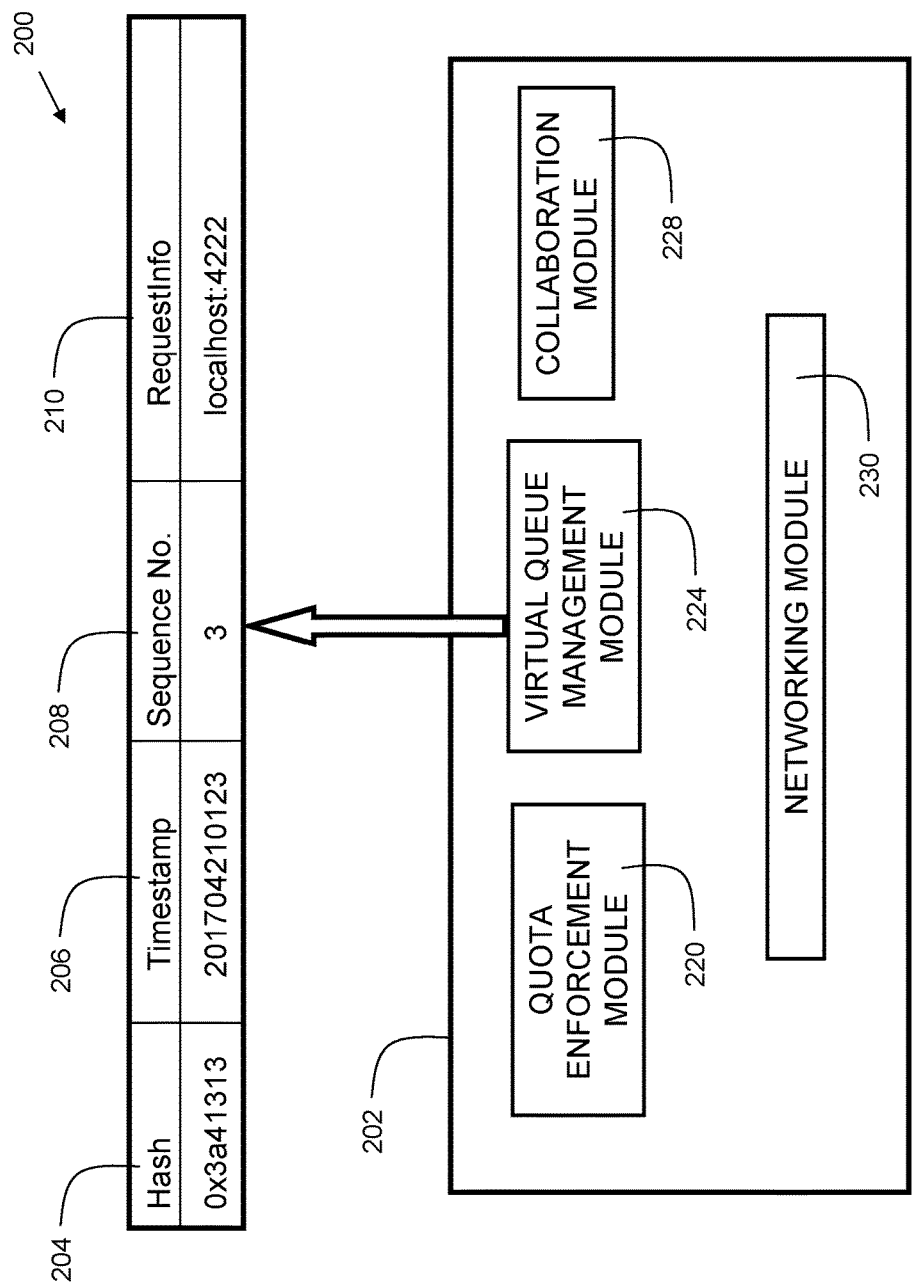
FIG. 2A is a block diagram showing a gateway and parameters in accordance with embodiments of the present invention.

FIG. 2A is a block diagram 200 showing a gateway 202 and various parameters in accordance with embodiments of the present invention. Gateway 202 includes multiple modules. These modules may be implemented via software, hardware, or a combination of hardware and software.

Gateway 202 includes a quota enforcement module 220. The quota enforcement module 220 serves to control the flow of network traffic based on policy. When there is no more quota for a specific traffic type, the quota enforcement module 220 buffers the request, or rejects the request depending on the configured policy. The quota enforcement module 220 also ensures the quota is synchronized across all of the gateways within the cluster.

Gateway 202 includes a virtual queue management module 224. The virtual queue management module 224 performs the function of determining/generating a virtual queue identifier for an incoming network message. For each request (network message) to be buffered (i.e., when exceeding quota), this module first calculates a hash value to uniquely identify the request for a policy (e.g., hash (IP, gateway id, http header, url)). The request is then sent from the receiving gateway into the corresponding virtual queue maintained by the gateway that is acting as the virtual queue manager for that queue. At the time the request is placed into the virtual queue, it contains the hash value 204, timestamp 206, sequence number 208, and the request info 210 (identifying information for the gateway that received and stores the request, but may not contain the network message itself). The network message can remain in the gateway that originally received it, unless transferred by the virtual queue manager for optimization/performance purposes.

In some embodiments, instead of, or in addition to an HTTP protocol, other protocols, such as the Message Queue Telemetry Transport (MQTT) protocol may be used. Other, suitable publish-subscribe protocols may also be used instead of, or in addition to, HTTP.

Gateway 202 includes a collaboration module 228. The collaboration module 228 performs the function of monitoring the cluster of gateways, and in embodiments, may employ a leader election algorithm to pick a leader for the virtual queue when quota assigned to the traffic is exhausted. The leader election algorithm can include the first gateway to receive network traffic for a given flow, a round robin technique, random selection, or other suitable technique.

Gateway 202 includes a networking module 230. The networking module 230 performs networking functionality to send requests to their destination when quota is available.

Figure 2B:
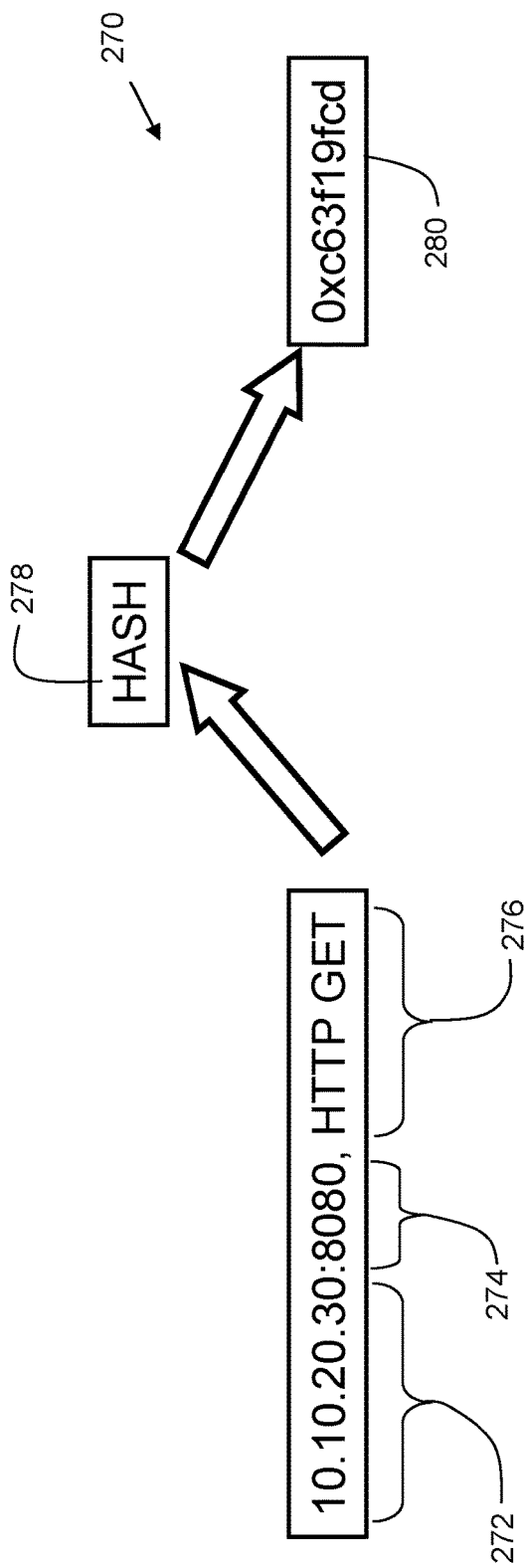
FIG. 2B illustrates an example of processing obtained identifying parameters to compute a virtual queue identifier.

FIG. 2B illustrates an example 270 of processing obtained identifying parameters to compute a virtual queue identifier. Identifying parameters may include an IP address 272, a port number 274, and/or an HTTP command 276. Thus, in embodiments, obtaining one or more identifying parameters includes obtaining a source IP address. Also, in embodiments, obtaining one or more identifying parameters includes obtaining an HTTP command. The identifying parameters may be part of the header of an incoming network message. Other identifying parameters are possible. The identifying parameters are input to a hash function 278. The hash function 278 outputs a hash value 280. In embodiments, the hash function 278 uses an MD5 hash algorithm.

In other embodiments, the hash function 278 uses a MurmurHash hash algorithm. Other hash algorithms are possible. Thus, in embodiments, creating the virtual queue identifier comprises computing a hash of the one or more identifiers. In embodiments, computing the hash comprises computing an MD5 hash of the one or more identifiers. In other embodiments, computing the hash comprises computing a MurmurHash hash of the one or more identifiers.

The virtual queue manager can perform a transaction transfer to allow transfers of requests/network messages from one gateway to another to perform resource balancing and/or defragmentation of the cluster. This can facilitate a more efficient operation of the gateway cluster.

Figure 3A:
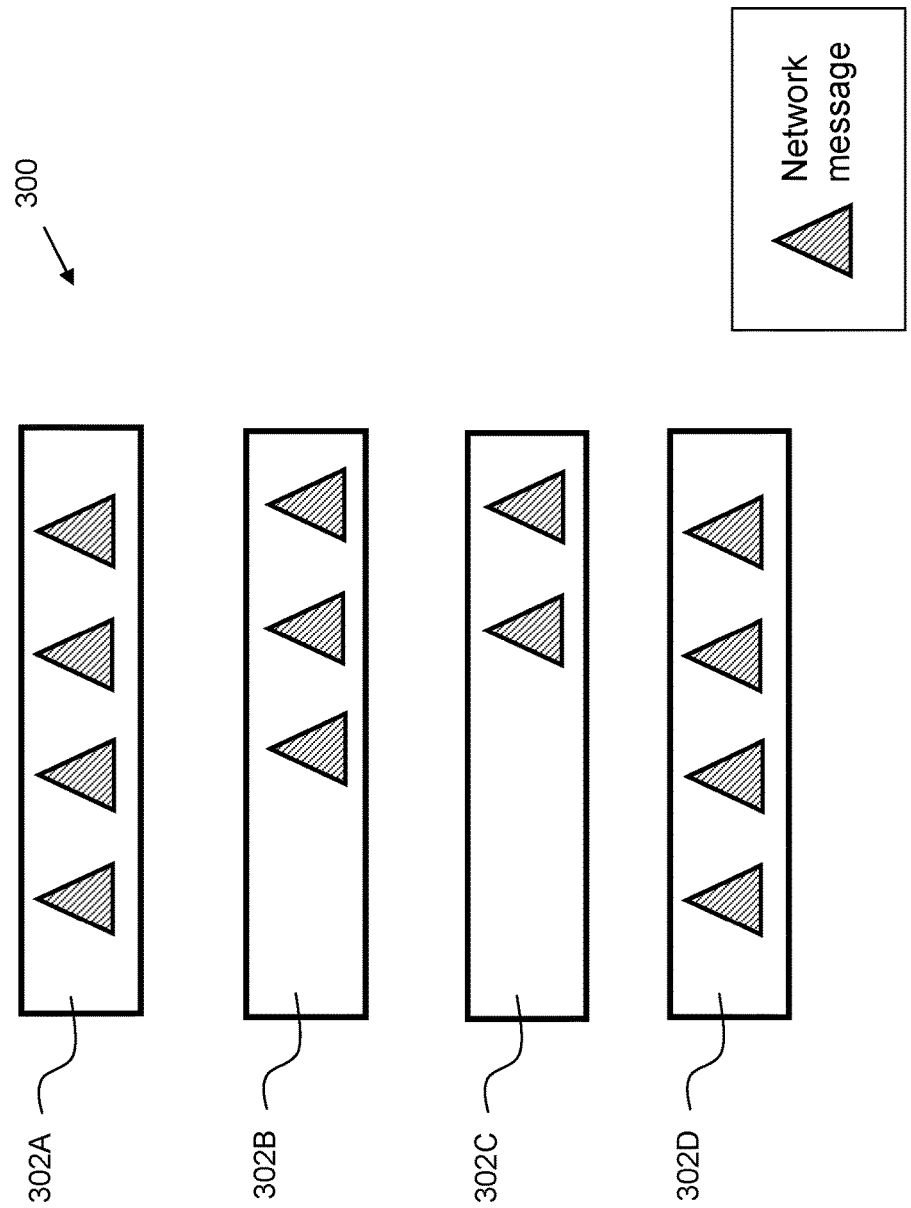

FIG. 3A and FIG. 3B illustrate an example of resource balancing in accordance with embodiments of the present invention. FIG. 3A shows example 300 including four gateways indicated as 302A-302D. Each triangle symbol represents a network message that is being buffered during a condition of quota exhaustion. In the example, each gateway has a capacity of four network messages. Thus, gateway 302A and gateway 302D are at full capacity and cannot accept any additional network messages.

Gateway 302B is currently storing three network messages and has room for one additional network message. Gateway 302C is currently storing two network messages and has room for two additional network messages.

FIG. 3B shows example 350 after a virtual queue manager instructs gateway 302D to transfer network message 308 from gateway 302D to 302C. In this way, the resources amongst the gateways in the cluster are more evenly balanced. This allows a more predictable and safer manner of operation of the gateway cluster, since now three of the four gateways have available capacity, whereas in the scenario depicted in FIG. 3A, only two of the four gateways had available capacity.

Thus, in embodiments, the virtual queue manager further performs the steps of: performing a resource analysis of each gateway of the plurality of gateways; instructing a first gateway of the plurality of gateways to transfer a network message to a second gateway of the plurality of gateways in response to detecting an available resource level of the first gateway below a first predetermined threshold; and detecting an available resource level of the second gateway above a second predetermined threshold. The resource analysis can include querying each gateway to determine its current resource levels (e.g., available memory and/or bandwidth for processing requests).

FIG. 4A and FIG. 4B illustrate an example of defragmentation in accordance with embodiments of the present invention. FIG. 4A shows example 400 including eight gateways, indicated as a 402A-416A within a cluster. Each of the gateways 402A-416A includes at least one network message corresponding to a particular virtual queue. Thus the virtual queue is fragmented, as it is spread out over numerous gateways. In embodiments, there may be a predetermined threshold established as a maximum number of gateways that can correspond to any given virtual queue. In such embodiments, the virtual queue manager may attempt to consolidate the requests (network messages) for a given virtual queue into fewer gateways. FIG. 4B shows example 450 after defragmentation of the virtual queue within the cluster. As can be seen in FIG. 4B, the traffic for the virtual queue resides in gateways 402B-410B, while gateways 412B-416B do not have any network messages or data corresponding to the virtual queue. Thus, in embodiments, the virtual queue manager further performs the steps of: performing a fragmentation analysis of the network traffic flow within the gateway cluster; and instructing a first gateway of the plurality of gateways to transfer a network message to a second gateway of the plurality of gateways in response to detecting a fragmentation level above a predetermined fragmentation threshold.

Figure 5:
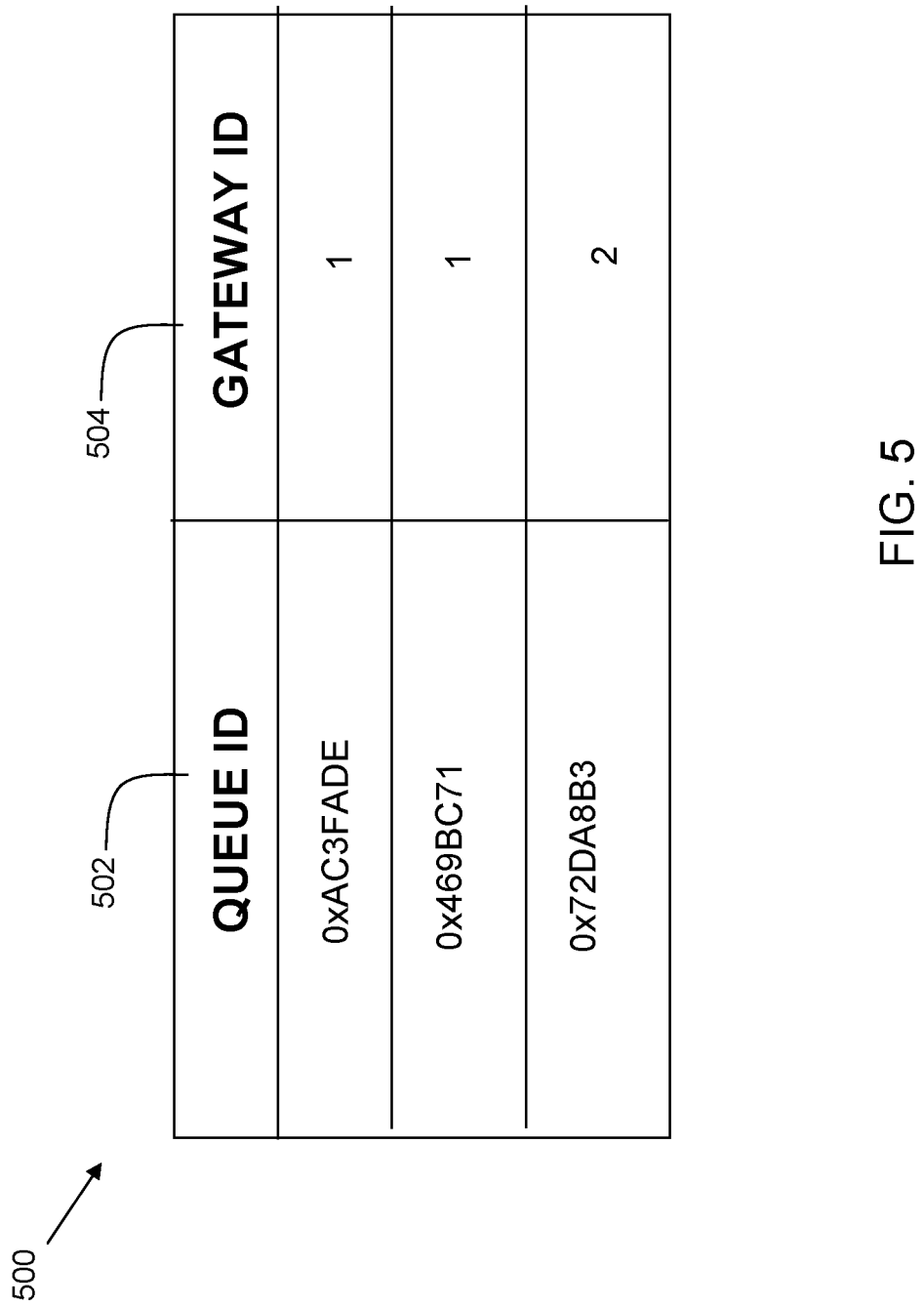
FIG. 5 illustrates a virtual queue table data structure in accordance with embodiments of the present invention.

FIG. 5 illustrates a virtual queue table data structure 500 in accordance with embodiments of the present invention. The virtual queue table data structure may be stored in the memory and/or storage of the gateway (see 142 and 144 of FIG. 1). Column 502 includes a virtual queue identifier, which can be a hash of obtained identifying parameters. Column 504 indicates a gateway identifier. Thus, each row of the virtual queue table data structure 500 indicates a virtual queue identifier and a corresponding gateway identifier. In embodiments, such a virtual queue table data structure 500 may be maintained by each gateway within a cluster. When a gateway receives network traffic, the hash is computed, and it is searched within virtual queue table data structure 500. If the hash is found, the corresponding gateway ID indicates the gateway that is acting as the virtual queue manager for this virtual queue. If not found, it indicates that the virtual queue does not exist, and the receiving gateway may then act as the virtual queue manager for this queue. The virtual queue manager may then notify the other gateways within the cluster, so that an entry indicating the newly created virtual queue can be entered in the virtual queue table data structure of the other gateways within the cluster.

Figure 6:
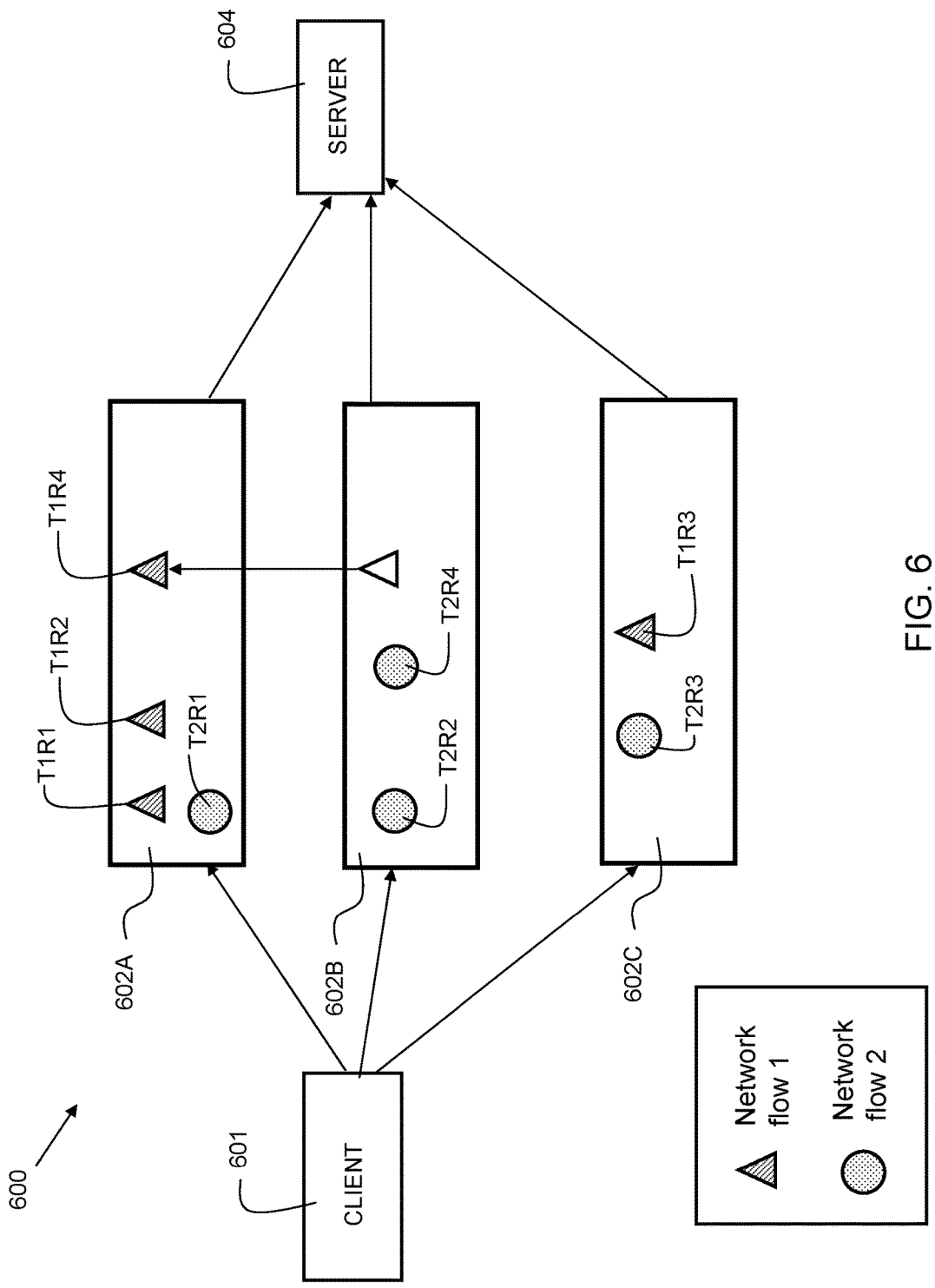
FIG. 6 is an example showing multiple network traffic flows.

FIG. 6 is an example 600 showing multiple network traffic flows. A client 601 is sending data to a server 604 via a gateway cluster comprising gateways 602A, 602B, and 602C. The triangle symbols indicate a first traffic flow, and the circle symbols indicate a second traffic flow. The traffic flows are denoted by the form TxRy, where X indicates the traffic flow, and Y indicates the request within that flow. For example, T1R1 indicates the first request in traffic flow 1, and T2R3 indicates the third request from traffic flow 2. In this example, gateway 602A is the virtual queue manager for the virtual queue associated with traffic flow 1. When gateway 602B runs low on resources, gateway 602A can instruct gateway 602B to transfer request T1R4 to server 604. This is an example of the resource management that the virtual queue manager can perform. When quota becomes available, the virtual queue manager executing on gateway 602A performs the following tasks:
1. Send T1R1 from gateway 602A to server 604
2. Send T1R2 from gateway 602A to server 604
3. Notify gateway 602C to send T1R3 to server 604
4. Send T1R4 gateway from 602A to server 604

In this way, the temporal order of messages from client 601 to server 604 is preserved. A similar process occurs for network flow 2, such that requests T2R1, T2R2, and T2R3 are sent to the server 604 in sequential order.

Figure 7:
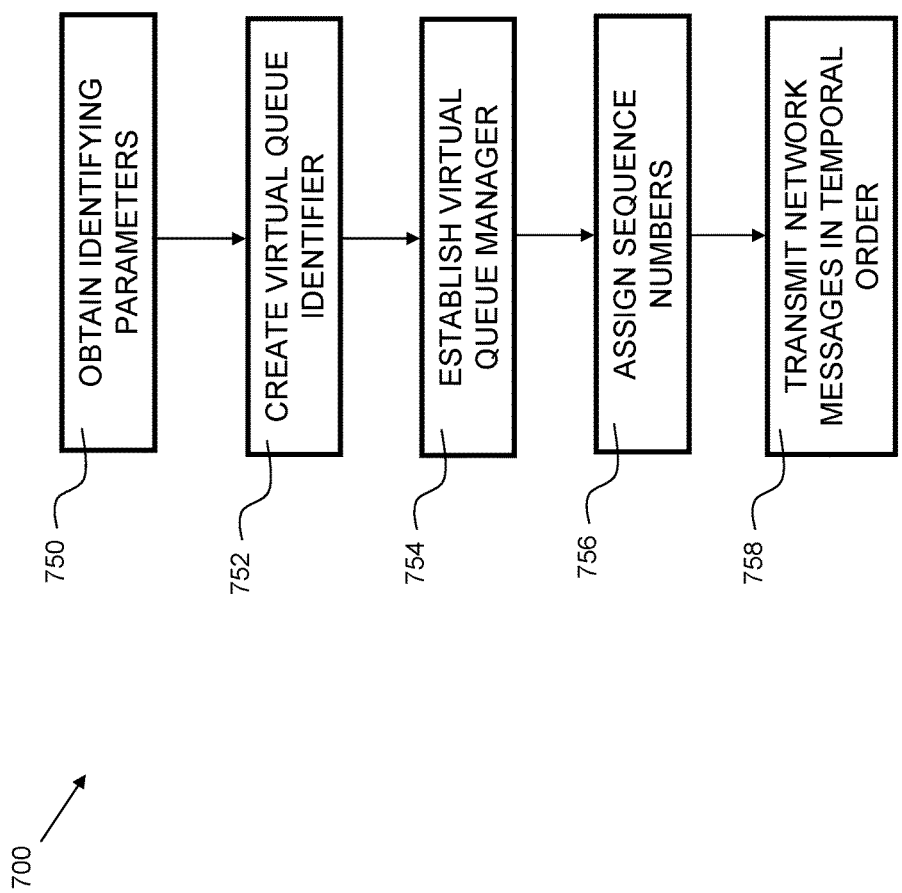
FIG. 7 is a flowchart indicating process steps for embodiments of the present invention.

FIG. 7 is a flowchart 700 indicating process steps for embodiments of the present invention. In process step 750, identifying parameters are obtained. These identifiers may be part of a header of a network message. The identifiers may include, but are not limited to, source IP address, source port, destination IP address, destination port, and/or HTTP command type (e.g., GET, POST, etc.). In process step 752, a virtual queue identifier is created. In embodiments, this includes performing a hash of the identified parameters. In embodiments, the hash may be an MD5 hash, a MurmurHash hash, or other suitable hashing or checksum algorithm. It is desirable to have a hashing function that is relatively fast and collision-free for optimal performance of the gateway cluster. In process step 754, a virtual queue manager is established (in the case where no virtual queue manager exists for the virtual queue identifier). In process step 756, sequence numbers are assigned. In process step 758, the sequence numbers may be assigned by the virtual queue manager as network traffic arrives to track the temporal sequence so that the network messages can be sent to the server in the proper order.

Figure 8:
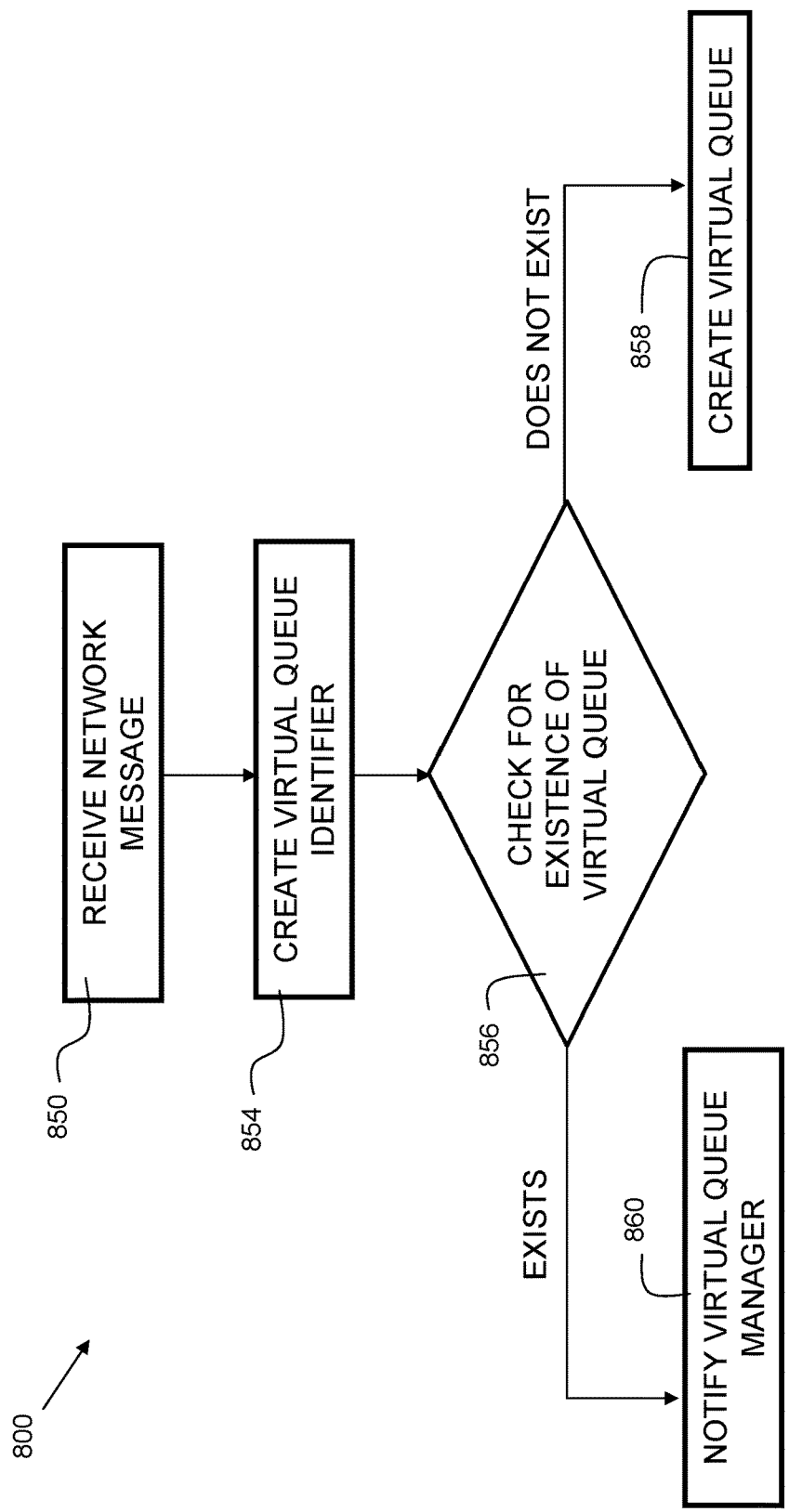
FIG. 8 is a flowchart indicating additional process steps for embodiments of the present invention.

FIG. 8 is a flowchart 800 indicating additional process steps for embodiments of the present invention. In process step 850, a network message is received. In process step 854, a virtual queue identifier is created by hashing. In process step 856, a check is made for existence of the virtual queue. In embodiments, this can include sending a broadcast query to the other gateways in the cluster to determine if any cluster is currently the virtual queue manager for the virtual queue identifier created in process step 854. If no affirmative responses are received, then the queue is considered to not exist. In other embodiments, a virtual queue table data structure such as shown in FIG. 5 is used to perform the check. If the queue exists, the process proceeds to process step 860 and the virtual queue manager is notified about the received network message. If the queue does not exist, the process proceeds to process step 858, and the virtual queue manager is created.

As can now be appreciated, disclosed embodiments improve system performance when a gateway cluster is operating under quota restrictions by implementing a virtual queue management system within the gateway. When a network message arrives at the gateway cluster, it is processed by one of the gateways within the cluster. The gateway that is processing the network message obtains identifying parameters. The identifying parameters can include, but are not limited to, an Internet Protocol (IP) address, a port number, and/or an HTTP command. The gateway creates a virtual queue identifier based on the obtained identifying parameters. The first gateway to receive a network message with a given virtual queue identifier assumes the role of virtual queue manager for that virtual queue. The virtual queue manager gateway informs other gateways within the cluster of the proper time for sending network messages to the server such that messages are transmitted to the server in the proper temporal order. In addition, functions such as resource management and defragmentation reduction are performed by the virtual queue manager to further improve reliability and performance of the gateway cluster.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for processing network traffic in a gateway cluster comprising a plurality of gateways, the method comprising:
    obtaining one or more identifying parameters for a network traffic flow comprising a plurality of network messages;
    creating a virtual queue identifier based on the one or more identifying parameters upon detecting a first instance of the one or more identifying parameters;
    establishing a virtual queue manager for a virtual queue associated with the virtual queue identifier on one gateway from the plurality of gateways; assigning a sequence number for each of the plurality of network messages; and transmitting the plurality of network messages in a temporal order based on the assigned sequence number.

2. The method of claim 1, wherein obtaining one or more identifying parameters includes obtaining a source IP address.

3. The method of claim 1, wherein obtaining one or more identifying parameters includes obtaining an HTTP command.

4. The method of claim 1, wherein creating the virtual queue identifier comprises computing a hash of the one or more identifiers.

5. The method of claim 4, wherein computing the hash comprises computing an MD5 hash of the one or more identifiers.

6. The method of claim 4, wherein computing the hash comprises computing a MurmurHash hash of the one or more identifiers.

7. The method of claim 1, wherein the virtual queue manager further performs the steps of:
    performing a resource analysis of each gateway of the plurality of gateways; and
    instructing a first gateway of the plurality of gateways to transfer a network message to a second gateway of the plurality of gateways in response to detecting an available resource level of the first gateway below a first predetermined threshold and detecting an available resource level of the second gateway above a second predetermined threshold.

8. The method of claim 1, wherein the virtual queue manager further performs the steps of:
    performing a fragmentation analysis of the network traffic flow within the gateway cluster, and
    instructing a first gateway of the plurality of gateways to transfer a network message to a second gateway of the plurality of gateways in response to detecting a fragmentation level above a predetermined fragmentation threshold.

9. An electronic computing device for processing network traffic, comprising:
    a processor;
    a memory coupled to the processor, the memory containing instructions, that when executed by the processor, perform the steps of:
    obtaining one or more identifying parameters for a network traffic flow comprising a plurality of network messages;
    creating a virtual queue identifier based on the one or more identifying parameters upon detecting a first instance of the one or more identifying parameters;
    establishing a virtual queue manager for a virtual queue associated with the virtual queue identifier on one gateway from the plurality of gateways;
    assigning a sequence number for each of the plurality of network messages; and
    transmitting the plurality of network messages in a temporal order based on the assigned sequence number.

10. The electronic computing device of claim 9, wherein the memory further contains instructions, that when executed by the processor, performs the step of obtaining a source IP address as one of the one or more identifying parameters.

11. The electronic computing device of claim 9, wherein the memory further contains instructions, that when executed by the processor, performs the step of obtaining an HTTP command as one of the one or more identifying parameters.

12. The electronic computing device of claim 9, wherein the memory further contains instructions, that when executed by the processor, performs the step of creating the virtual queue identifier by computing a hash of the one or more identifiers.

13. The electronic computing device of claim 9, wherein the memory further contains instructions, that when executed by the processor, performs the steps of:
performing a resource analysis of each gateway of a plurality of gateways comprising a gateway cluster; and
instructing a first gateway of the plurality of gateways to transfer a network message to a second gateway of the plurality of gateways in response to detecting an available resource level of the first gateway below a first predetermined threshold and detecting an available resource level of the second gateway above a second predetermined threshold.

14. The electronic computing device of claim 13, wherein the memory further contains instructions, that when executed by the processor, performs the steps of:
performing a fragmentation analysis of the network traffic flow within the gateway cluster, and
instructing a first gateway of the plurality of gateways to transfer a network message to a second gateway of the plurality of gateways in response to detecting a fragmentation level above a predetermined fragmentation threshold.

15. A computer program product for processing network traffic in a gateway cluster on an electronic computing device, the electronic computing device comprising a computer readable storage medium having program instructions embodied therewith, the program instructions executable by a processor to cause the electronic computing device to:
obtain one or more identifying parameters for a network traffic flow comprising a plurality of network messages;
create a virtual queue identifier based on the one or more identifying parameters upon detecting a first instance of the one or more identifying parameters;
establish a virtual queue manager for a virtual queue associated with the virtual queue identifier on one gateway from the plurality of gateways;
assign a sequence number for each of the plurality of network messages; and
transmit the plurality of network messages in a temporal order based on the assigned sequence number.

16. The computer program product of claim 15, further comprising program instructions executable by the processor to cause the electronic computing device to obtain a source IP address as one of the one or more identifying parameters.

17. The computer program product of claim 15, further comprising program instructions executable by the processor to cause the electronic computing device to obtain an HTTP command as one of the one or more identifying parameters.

18. The computer program product of claim 15, further comprising program instructions executable by the processor to cause the electronic computing device to create the virtual queue identifier by computing a hash of the one or more identifiers.

19. The computer program product of claim 15, further comprising program instructions executable by the processor to cause the electronic computing device to perform the steps of:
performing a resource analysis of each gateway of the plurality of gateways; and
instructing a first gateway of the plurality of gateways to transfer a network message to a second gateway of the plurality of gateways in response to detecting an available resource level of the first gateway below a first predetermined threshold and detecting an available resource level of the second gateway above a second predetermined threshold.

20. The computer program product of claim 15, further comprising program instructions executable by the processor to cause the electronic computing device to perform the steps of:
performing a fragmentation analysis of the network traffic flow within the gateway cluster, and
instructing a first gateway of the plurality of gateways to transfer a network message to a second gateway of the plurality of gateways in response to detecting a fragmentation level above a predetermined fragmentation threshold.

* * * * *